J. B. NICHOLSON.
MACHINE FOR MANUFACTURING RIBBED AND HILLSIDE PAVING BLOCKS.
APPLICATION FILED JAN. 19, 1915.

1,161,956.

Patented Nov. 30, 1915.
3 SHEETS—SHEET 1.

WITNESSES

INVENTOR
Joseph B. Nicholson,
By H.W. Stevenson
Attorney

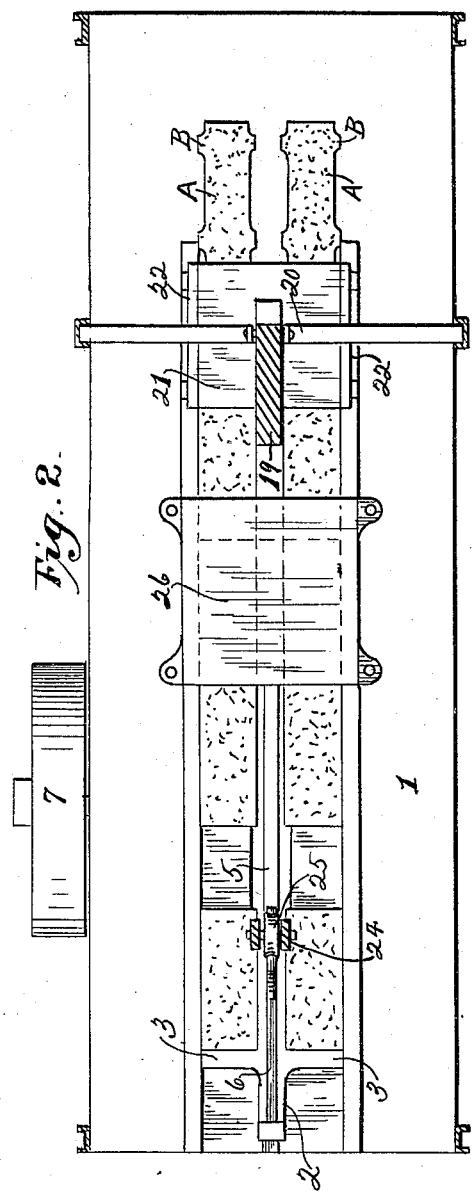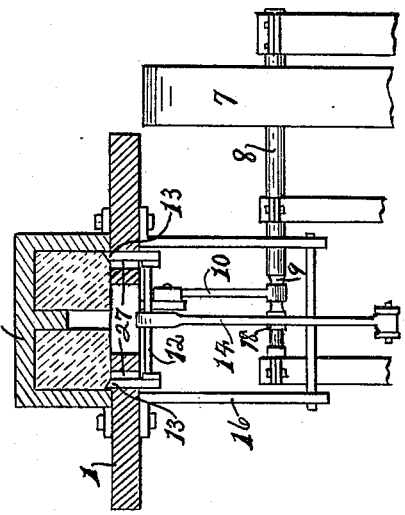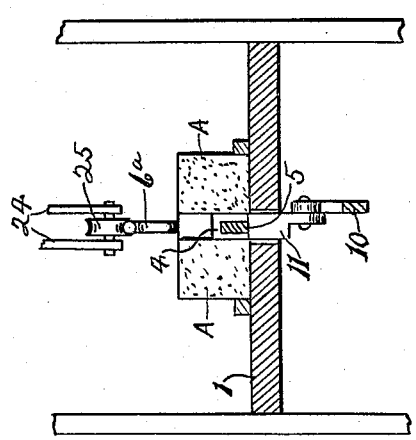

J. B. NICHOLSON.
MACHINE FOR MANUFACTURING RIBBED AND HILLSIDE PAVING-BLOCKS.
APPLICATION FILED JAN. 19, 1915.

1,161,956.

Patented Nov. 30, 1915.

3 SHEETS—SHEET 3.

WITNESSES

INVENTOR
Joseph B. Nicholson,
By H. W. Stevenson
Attorney

UNITED STATES PATENT OFFICE.

JOSEPH B. NICHOLSON, OF STEUBENVILLE, OHIO.

MACHINE FOR MANUFACTURING RIBBED AND HILLSIDE PAVING-BLOCKS.

1,161,956.   Specification of Letters Patent.   Patented Nov. 30, 1915.

Application filed January 19, 1915. Serial No. 3,054.

*To all whom it may concern:*

Be it known that I, JOSEPH B. NICHOLSON, a citizen of the United States, residing at Steubenville, in the county of Jefferson and State of Ohio, have invented a certain new and useful Improvement in Machines for Manufacturing Ribbed and Hillside Paving-Blocks, of which the following is a specification.

This invention relates to the art of brick or paving block manufacture, and has for its primary object the provision of a machine or mechanism designed to produce a peculiar style of paving blocks involving integral spacing ribs, together with a particular design of block adaptable for hillside paving, or other various modifications susceptible of being turned out by the device hereinafter described in detail and shown as a part thereof in the accompanying drawings.

In my pending application for patent on machine for manufacturing ribbed paving block, Serial Number 847,304, filed June 25, 1914, there is disclosed a knife or cutting member held stationary on a table, the block material to be operated on being shoved over said knife, while in the present invention, which I consider is an improvement over the said former pending application, there is provided suitable mechanism whereby this cutting knife, in a somewhat modified form, is rendered movable, either vertically or horizontally, to effect its cutting function on the blocks presented in sequence.

In the accompanying drawings are shown the preferred embodiment of my invention, wherein—

Figure 1:
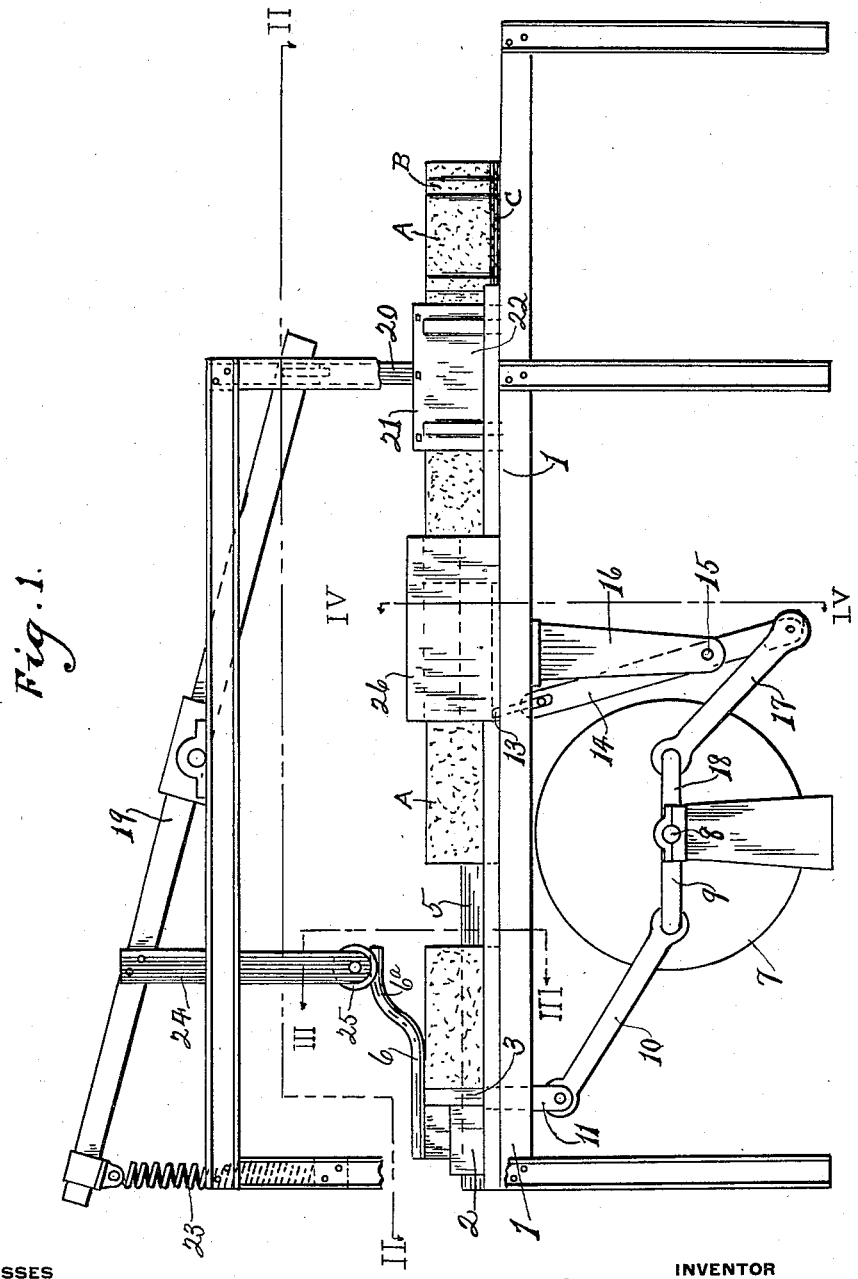
Figure 5:
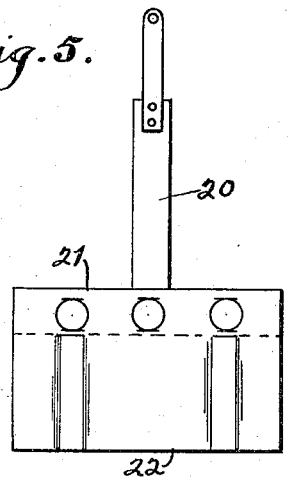
Figure 6:
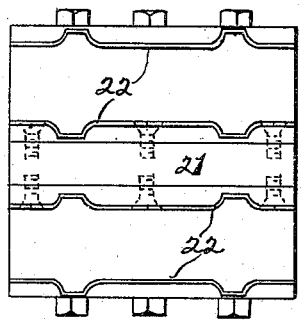
Figure 7:
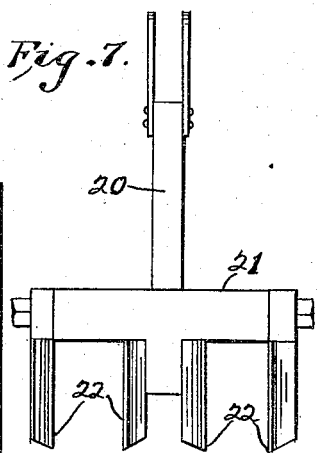
Figure 9:
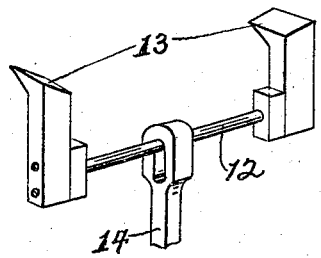
Figure 8:
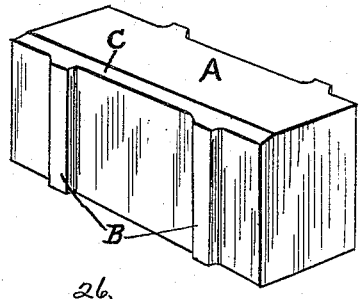
Figure 10:
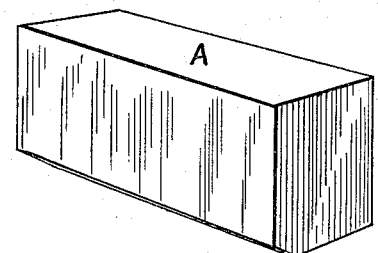
Figure 11:
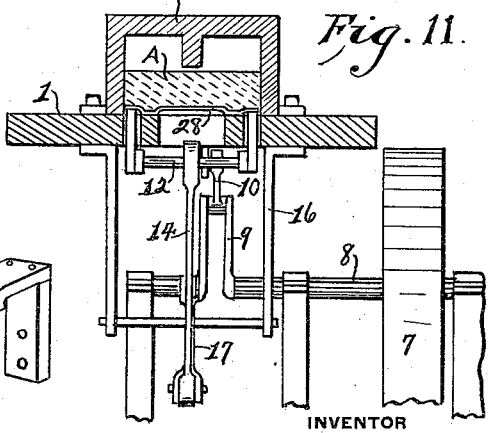
Figure 12:
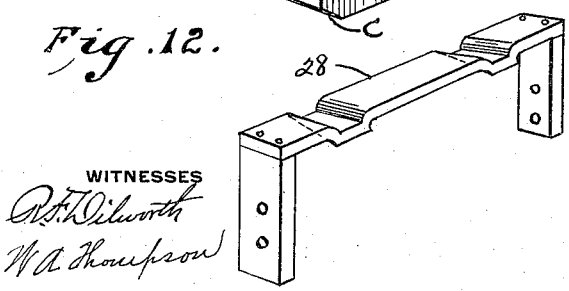

Figure 1 is a side elevation of the complete assembled machine, showing a series of blocks in process of being operated on by the cutting elements; Fig. 2 is a plan view of the same taken on the line 11—11 of Fig. 1; Fig. 3 is a transverse section partly broken away and taken on the line 111—111 of Fig. 1; Fig. 4 is a similar view taken on the line IV—IV of Fig. 1; Fig. 5 is a side view in elevation of one of the vertically actuated cutting members, together with a portion of the mechanism for operating same; Fig. 6 is a bottom plan view of a plurality of these cutting members in secured position on the carrying frame; Fig. 7 is an end view in elevation of these cutting members and supporting frame; Fig. 8 shows a finished block as turned out by the machine having spaced-apart integral ribs formed transversely of its two opposite side portions, one of its longitudinal edges being beveled; Fig. 9 shows a pair of beveling knives together with a portion of the mechanism for carrying and operating same; Fig. 10 shows in perspective a partially completed block after being subjected to the action of the beveling knives; Fig. 11 is a cross section taken on the line IV—IV of Fig. 1 showing operating position of a rib forming knife as substituted for the beveling knives shown in Fig. 4; and Fig. 12 is a view in perspective of this modified construction of rib forming knife, together with its supporting members.

The previously cut blocks, which are brought in their unburned condition to the feed end of the machine by a suitable belt, not shown, are placed by the operator on the table 1, preferably in pairs, in order to expedite the work of the machine and insure a maximum output, the operator, who stands at the feed end, first positioning the blocks, edge up, against the laterally projecting wings or pushing members 3, forming a part of the reciprocally actuated plunger 2, and spaced-apart by the centralized longitudinally extending rib or dividing member 4, that is preferably of an inverted U-shape, and straddles the removably mounted rail or guide piece 5, which latter part extends practically the entire length of the table, and serves as a means for keeping the blocks separated as they are moved along the table toward the cutting mechanism. Adequately mounted on and supported by the said plunger 2 is a rail 6, which will be approximately fourteen inches in length over all, said rail for approximately nine inches being level and lying in a practically horizontal plane, while the remaining five inches of its length is made with a gradual incline of a predetermined degree, the outer free end 6$^a$ being elevated approximately four inches above the top surface of said plunger. These given dimensions can of course be modified in accordance with the requirements that future reduction to practice may dictate. This plunger has a reciprocal movement forward and backward of approximately fourteen inches, and the operation of this member is brought about by a power driven wheel 7 keyed or otherwise mounted on a shaft 8, that has a crank portion 9, to which is pivotally connected a link 10, whose opposite end is also pivotally joined to a depending portion 11 forming a rigid section of the said plunger.

Arranged on the under side of the table in advance of the forward position allowed the said plunger 2, and mounted for a reciprocal movement of approximately nine inches, or the full length of a paving block or brick, is a carriage 12 which carries one or more of the knives or cutting members 13, shown in Fig. 9, and of a design suitable for slicing off one longitudinal edge of each block presented thereto, thus forming the bevel portion "C" to adapt the block for hillside paving purposes. The mechanism employed to give this knife carrying member 12 its required movement consists in a lever arm 14 fulcrumed at a point 15 to the lower extremity of a hanger or support 16, the upper end of said lever being slotted to allow for the proper adjustment during its reciprocal movement, and is in pivotal union with the carrier 12, the lower end of said lever being also pivotally connected to a link 17, which is in turn pivotally joined to a second crank portion 18 formed in the driving shaft 8.

The mechanism for forming the integral ribs on one or both sides of the block consists of a walking beam, or oscillating lever 19, its fulcrum point being located about the approximate center of the machine, and near the top thereof, as shown. To the forward end of this lever is pivotally connected a depending arm or supporting member 20, which carries a suitable frame 21, housing a plurality of spaced-apart cutting knives 22; four being shown herewith. These said knives involve longitudinally spaced-apart cutting edges of the required configuration for forming the separated ribs "B" on the blocks, and are of the approximate same length as the said blocks, each knife having a suitable shank to act as a securing means, and provide for the required depth of the cut when operated in a perpendicular path. To the opposite end of said lever 19 there is secured one end of a tension spring member 23, which is suitably anchored in the frame of the machine, while approximately midway between the fulcrum point and said spring there is rigidly connected a lifting member or vertically actuated link 24, whose lower extremity reaches to the track 6, mounted on the plunger 2, and carries a wheel 25, designed to travel over said track.

During each and every half revolution of the crank arm 9 the plunger 2 is alternately drawn forward and backward in its path of approximately fourteen inches, more or less, this function being regulated by the necessary length given to the said crank, in order that during its orbital path in describing half its full movement it will, by means of the connecting link 10, pull said plunger the full length of the required stroke, and while describing the other half of its orbital path will, by the same means, reverse the movement of said plunger, and return it to its normal attitude adjacent the feed end of the machine. The speed given to the driving mechanism will naturally determine the number of strokes per minute permitted the said plunger, and for all practical purposes I have found that about twenty-five strokes per minute will insure a proper output for the machine. This speed can of course be varied to accommodate different conditions.

The previously cut blocks, in their green or unburned state, are placed on the table, preferably two at a time, when the plunger 2 is at its limit of backward stroke, or the position shown in Fig. 1, at which time the wheel 25 will have arrived at the highest part of the track 6ª, thereby forcing the link 24 to elevate the spring connected section of the oscillating lever 19, and incidentally lower the opposite end to depress the knife carrying frame 21. On the forward stroke of the plunger the previously positioned blocks are shoved ahead over the table approximately nine inches by contact of the last inserted blocks, all the blocks remaining stationary during the reverse or backward stroke of the plunger. As the blocks arrive in pairs, or singly as the case may be, within the walled-in tunnel or passage-way 26, they are then subjected, on their under disposed surface, to the cutting action of the beveling knives 13, or substitute elements, the carrier 12 being moved simultaneously in the same direction with the receding or advancing plunger 2 by the concerted action of the crank 18, lever 14, and connecting link 17. The blocks being acted on by the beveling knives are held against displacement by the walls of the tunnel 26, and are further backed up by the contacting blocks immediately ahead and following, so that the under cut beveling process can be accomplished with the blocks at rest, and while the plunger 2 is being returned to its normal position after making the forward stroke. The table 1, within said tunnel is provided with suitable apertures or slots 27 for taking care of the offal removed from the blocks during said cutting process, which waste material falls onto a conveyer belt, not shown. After receiving the beveling action the blocks are again moved forward, by the pushing action of the plunger 2, until they reach an advanced position directly beneath the vertically actuated knives 22. Owing to the prearranged shape of these knives, involving the spaced-apart cutting edges, there will be removed from the two vertically positioned sides of each block thus presented, sufficient segments of the material to leave spaced-apart integral ribs or lugs "B" on said blocks "A".

The particular mechanism here employed for accomplishing this result is as follows: At each forward stroke of the piston 2 the wheel 25 will ride the rail 6, starting from its position at the elevated position of said rail, as shown in Fig. 1, descending the inclined section, and when said plunger has completed approximately five inches of its forward stroke, the wheel 25 will have arrived at the lowest point of said rail, or the bottom of the inclined section 6ª. The instant said wheel begins its descent along the rail the spring 23 contracts automatically and exerts a downward pull on that end of the fulcrumed lever 19, which incidentally raises the opposite end and lifts the knife carrying member 21 clear of the previously rib formed block. The completed block or blocks are then forced ahead out from beneath said knives as the plunger continues or completes its forward stroke of approximately nine inches. The next succeeding block or blocks, which have already been subjected to the beveling process, are thus shoved into position directly beneath the vertically actuated knives 22 by the time the plunger has completed its forward stroke, at which period the wheel 25 will have arrived at the end of the rail farthest removed from the elevated section. During the last five inches in the total backward stroke of approximately fourteen inches made by said plunger the wheel 25 again ascends the inclined section of the rail 6ª, and in so doing forces upward on the link 24, raising the spring connected end of the fulcrum lever 19, thereby lowering the opposite end, and forcing down the carrier 21, causing the knives 22 to perform their function of forming the integral ribs on the block or blocks positioned underneath, the offal dropping through suitable apertures provided in the table onto a conveyer belt directly below, not shown however.

Should I desire to dispense with the beveling feature of the machine, the cutting members 13 can be removed from their supporting structure 12, and by substituting the form of knife 28 shown in Fig. 12 integral ribs may be provided on the face of the blocks presented to the horizontally movable cutting action of said knife, as actuated by the fulcrumed lever 14 and associated mechanism heretofore described in detail. It is further apparent that it is possible to dispense with at least two of the knives 22 and form the integral ribs "B" on one side of each block, and that said knives are susceptible of re-arrangement to suit variable conditions or styles of blocks to be turned out by the machine. Modification in the detail construction of the knives is also possible in the event of it being desired to produce various other forms of either brick or paving blocks, therefore I do not limit myself to the exact formation here disclosed, but reserve the privilege of making such changes as may be necessary to produce any required style of brick or block capable of being turned out by this machine, and within the scope of the appended claims. The cranks 9 and 18 being in different planes do not interfere with one another, and permit independent orbital travel of their respectively connected link members, the crank 9 having a somewhat longer orbital travel or path than the oppositely disposed crank 18. Should it be desired to feed one block at a time, instead of in pairs as shown, the central guide piece 5 would be removed in order to permit positioning of the blocks with their longitudinal length transversely of the table, in order that the under disposed side portion may be subjected to the cutting action of the knife.

What I claim as my invention is:—

1. A machine for forming spacing ribs on unburned paving blocks, involving a suitable structure having a table portion; a suitably housed and vertically movable knife arranged above the table, having spaced-apart cutting edges; a reciprocally actuated plunger mounted on the table for presenting the blocks to the cutting action of said knife; and mechanism, involving a fulcrumed lever connected to the knife housing and carrying a lifting member, coöperating with an inclined rail carried by the plunger, for operating the knife during the movement of said plunger.

2. A machine for forming spacing ribs on unburned paving blocks, involving a suitable structure having a table portion; a suitably housed and horizontally movable knife arranged in the table, having spaced-apart cutting edges; a reciprocally actuated plunger mounted on the table for presenting the blocks to the cutting action of the knife; and mechanism, involving a lever secured to the knife housing and fulcrumed below the table, coöperating with a crank operated link connected to said lever, for operating said knife.

3. A machine for forming spacing ribs on unburned paving blocks, involving a suitable structure having a table portion; a horizontally movable and reciprocally actuated knife having spaced apart cutting edges; mechanism for mounting and operating the knife; and a reciprocally actuated plunger mounted on the table for presenting the blocks to the cutting action of the knife.

4. In a device of the character described, a suitable structure having a table portion; a plunger mounted for reciprocal movement on the table for advancing the material being worked on; a suitably housed knife arranged for horizontal reciprocal movement in the table; mechanism, connected with a power driven means, for operating said knife; a second suitably housed knife arranged for vertical reciprocal movement above the table; and mechanism, coöperating with the movement of said plunger, for raising and lowering said second knife.

5. In a machine of the character described, a suitable structure having a table portion; a fulcrumed lever, to one end being secured a vertically actuated housing carrying a plurality of separated knives, each knife being provided with spaced-apart cutting edges for forming integral ribs on the blocks presented in sequence; a reciprocally actuated plunger mounted on the table for presenting the blocks to the cutting action of the knives; and means, coöperating with the movement of said plunger, for operating the lever, thereby raising and lowering the said knives.

6. In a machine of the character described, a suitable structure having a table portion; a fulcrumed lever, to one end being secured a horizontally actuated housing carrying one or more slicing knives, for forming a bevel on the blocks presented in sequence; a reciprocally actuated plunger mounted on the table for presenting the blocks to the cutting action of said knives; and power driven means, connected to said lever and coöperating with the movement of said plunger, for operating the knife housing.

In testimony whereof I affix my signature in the presence of two witnesses.

JOSEPH B. NICHOLSON.

Witnesses:
 BERTHA TROTH,
 H. W. STEVENSON.

Copies of this patent may be obtained for five cents each, by addressing the "Commissioner of Patents, Washington, D. C."